FIG. 1

INVENTOR.
WILSON T. KING

Dec. 8, 1970 W. T. KING 3,545,092
METHOD FOR ALIGNING A NAVIGATION SYSTEM
Filed July 1, 1965 6 Sheets-Sheet 5

FIG. 5

INVENTOR.
WILSON T. KING
BY
ATTORNEY

FIG. 6

United States Patent Office 3,545,092
Patented Dec. 8, 1970

3,545,092
METHOD FOR ALIGNING A NAVIGATION SYSTEM
Wilson T. King, Westminster, Calif., assignor to North American Rockwell Corporation, a corporation of Delaware
Filed July 1, 1965, Ser. No. 468,729
Int. Cl. G01c 19/38
U.S. Cl. 33—226                                  3 Claims

ABSTRACT OF THE DISCLOSURE

This method is directed to aligning an inertial navigator platform about its azimuth axis by utilizing a four-position gyrocompassing technique, applied to an additional gyroscope which is mounted on the inertial navigator platform which carries level detectors used in leveling the platform. The gyrocompass provides an accurate indication of the direction of a true east-west line with respect to the platform's reference axis enabling the platform to be positioned accurately to any position about the azimuth axis.

---

This invention relates to a method for aligning a navigation system, and more particularly to a method which utilizes a four-position gyrocompassing technique for self-aligning a navigation system. In addition, it relates to a method of aligning a separate optical device to a high degree of accuracy.

An inertial navigation system typically comprises a plurality of accelerometers which measure vehicle accelerations along the axes of a set of two or more orthogonal axes and a plurality of gyroscopes which define a set of three orthogonal reference axes having a predetermined relationship to inertial space. Gyroscopes are utilized to maintain the accelerometers in a known orientation. In order to maintain a usable degree of accuracy the accelerometers must be correctly aligned with respect to the inertial space coordinates. A navigation system computer is generally used to maintain the desired degree of accuracy by periodically feeding to the gyroscopes correction signals which in turn correct the orientation of the platform on which the gyroscopes and accelerometers are mounted. Various techniques have been used to determine the correction signals that the computer must supply to the gyroscopes in order to maintain the desired degree of accuracy. However, there remains the problem of establishing the initial alignment of the navigation system before the vehicle in which the system is mounted begins its navigating.

In vehicles, such as aircraft and missiles, the inertial navigation system's three orthogonal platform axes are generally called the pitch, roll, and yaw axes so as to represent similar named motions of the vehicles.

Alignment of the inertial navigator about the pitch and roll axes is generally accomplished with the craft stationary by sensing the component of acceleration (gravity) operating along the sensitivity axes of the platform accelerometers which will produce an indicated output. This makes it possible to level and align the platform using these indicated outputs. Bubble levels which sense the local gravity may provide the local vertical reference in place of the platform accelerometers. Alignment of the platform about the azimuth (yaw) axis of the platform is necessary to establish the sensitive axes of the accelerometers parallel to the axes of the coordinate system in which the navigation problem is to be solved. Manual azimuth alignment schemes generally employ a pair of precision theodolites equipped with autocollimating pieces as tools for sighting on mirrors mounted to the platform. The platform mirrors in turn are precisely attached to the platform and are accurately aligned to a known angle with respect to the accelerometer sensing axes. Theodolite settings are taken on the mirrors as the platform is rotated in azimuth until the desired azimuth orientation is obtained. One alignment method which does not require an external reference is the gyrocompass method.

In the gyrocompass method, a single degree of freedom gyroscope is aligned on the platform with its spin axis nominally north, its input axis along an east-west line and its output axis along a local vertical line. By sensing the torques acting upon the gyroscope which cause it to precess about its output axis, it is possible to detect the misalignment of the gyroscope's input axis from the true east-west line. The axes of the platform accelerometers may then be aligned in a desired azimuth position with respect to a known true east-west line.

An azimuth correction bias may thus be calculated which represents the gyroscope's input axis misalignment from a reference axis on the platform.

The method of this invention makes use of a four-position gyrocompass and the data collected in these four gyrocompassing positions to provide a self-alignment technique for an inertial navigator. The data obtained in the four positions is averaged to provide an accurate indication of the misalignments of the gyrocompass input axis with respect to the platform's reference axis and the true east-west line.

Accordingly, it is an object of this invention to provide a method for self-aligning an inertial navigation platform.

It is another object of this invention to provide a unique method for the alignment of an inertial navigation platform utilizing a gyrocompass.

It is still another object of this invention to provide a method for determining an accurate azimuth reference line for an inertial navigator.

A further object of this invention is to provide a method of averaging out the misalignment errors of a gyrocompass.

A still further object of this invention is to provide a method using a gyrocompass in four positions for determining precisely a reference line.

These and other objects of the invention will become more apparent when taken in conjunction with the description and following drawings, in which.

Figure 1:
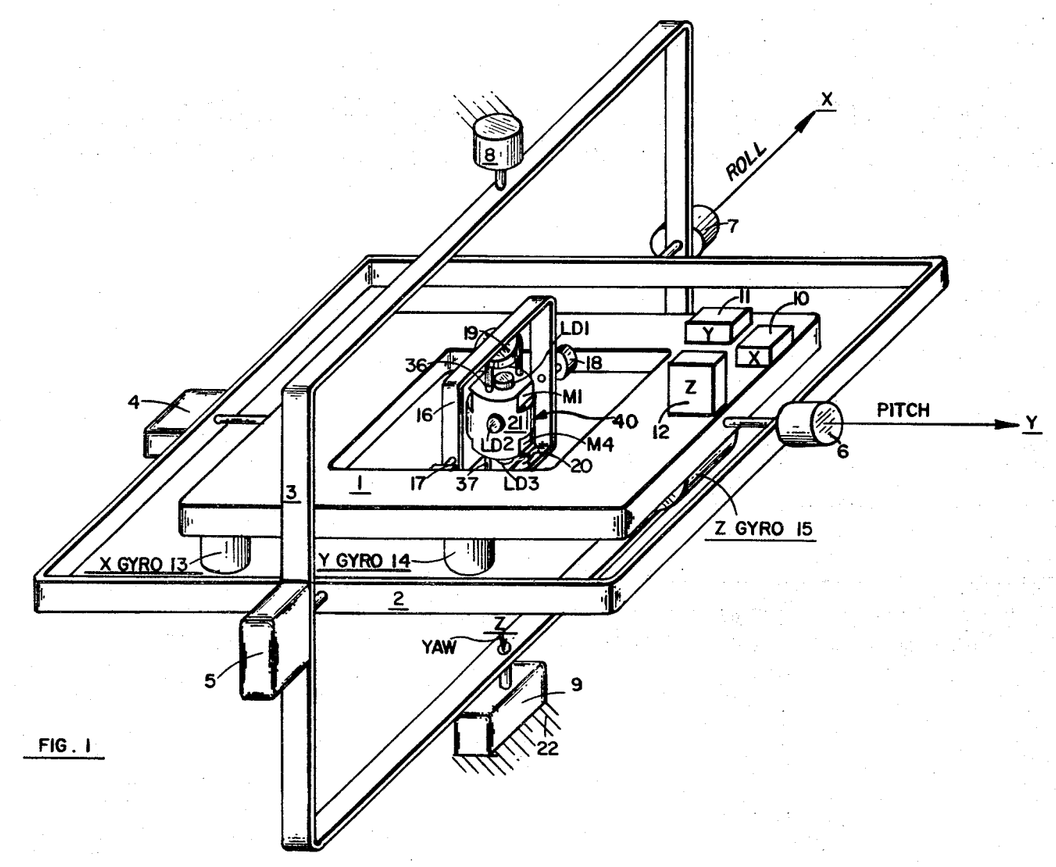
FIG. 1 illustrates a particular embodiment of this invention.

Referring now to FIG. 1, a typical inertial stable platform is illustrated as comprising a platform 1 on which are fixedly mounted X, Y, and Z accelerometers 10, 11, and 12, respectively, and stabilizing single axis gyroscopes 13, 14, 15. The platform 1 is mounted to a vehicle frame 22 to be navigated by means of a three-axis gimbal system depicted by gimbals 2 and 3, and as is well-known, will permit complete (three degree) rotational freedom of the platform 1 with respect to the vehicle frame 22. The platform is mounted for rotation about the Y axis by torquer motor 4 and resolver 6, and about the X axis by torquer motor 5, resolver 7 and the roll gimbal 2 which is in turn pivotally mounted for rotation about the Z axis by the yaw gimbal 3. The yaw gimbal is pivoted to the vehicle 22 for rotation about the Z axis by torquer motor 9 and resolver 8. Departures of the platform from an attitude defined by the three mutually orthogonal gyroscopes 13, 14 and 15 is sensed by gyroscope pickoffs (not shown) to provide signals to the roll, yaw, and pitch torquer motors which rotate the respective platform gimbals so as to maintain the platform in the predetermined attitude defined by the gyroscopes collectively. The sensing axes of the accelerometers are mutually orthogonal with accelerometer 10 being sensitive to changes in motion along the X axis, accelerometer 11 being sensitive to changes in motion along the Y axis, and accelerometer 12 being sensitive to changes in motion along the Z axis. The particular details of the stable platform, its components, mountings and servo drives are well-known to those skilled in the art. A typical 3-axis stable platform is shown, for example, in U.S. Pat. No. 3,050,995, entitled Autonavigator by L. C. Dozier, Jr., and assigned to North American Aviation, Inc., the assignee of the present invention. Mounted to the platform with two degrees of angular freedom is an additional single-degree-of-freedom gyroscope 40 which performs the function of a gyrocompass. Torquer motor 17 and resolver 18 along with gimbal 16 allow for a first degree of angular freedom. Torquer motor 20 and resolver 19 in combination with the pairs of supporting members 37 and 36 provide gyrocompass 40 with the second degree-of-angular freedom. The pairs of supporting members 37 and 36 are fixedly attached to the gyroscope case 21. Mounted to the gyroscope case 21 in parallel planes on opposing surfaces of the case are mirrors M1, M2, M3, and M4. Level detectors LD1 and LD3 are mounted perpendicular to the mirror surfaces of M1 and M2 and on opposing ends of the gyroscope case 21. Level detector LD2 is mounted on the case mutually orthogonal with respect to the mirrors M1 and M2 and level detectors LD1 and LD3. The level detectors may be any convenient means for detecting the $g$ vector (gravity acceleration), such as electrical bubble levels, vertical detectors or other sensing devices.

Bubble level detectors which may be used in combination with the gyroscope 40 are shown in further detail in U.S. Pat. No. 2,252,727 entitled Telemetric Level by T. B. Pepper, and U.S. Pat. No. 2,427,902, entitled Apparatus for the Gravitational Control of Photo-Electric Cells by J. C. Clifton et al. In U.S. Pat No. 2,825,978, entitled Electromechanical Sensing Device by C. W. Davis, a two-axis level detector is disclosed.

In the particular embodiment illustrated the level detectors are considered to be of the two-axis type, that is, they may determine whether a structure is level in both the X and Y directions.

Figure 2:
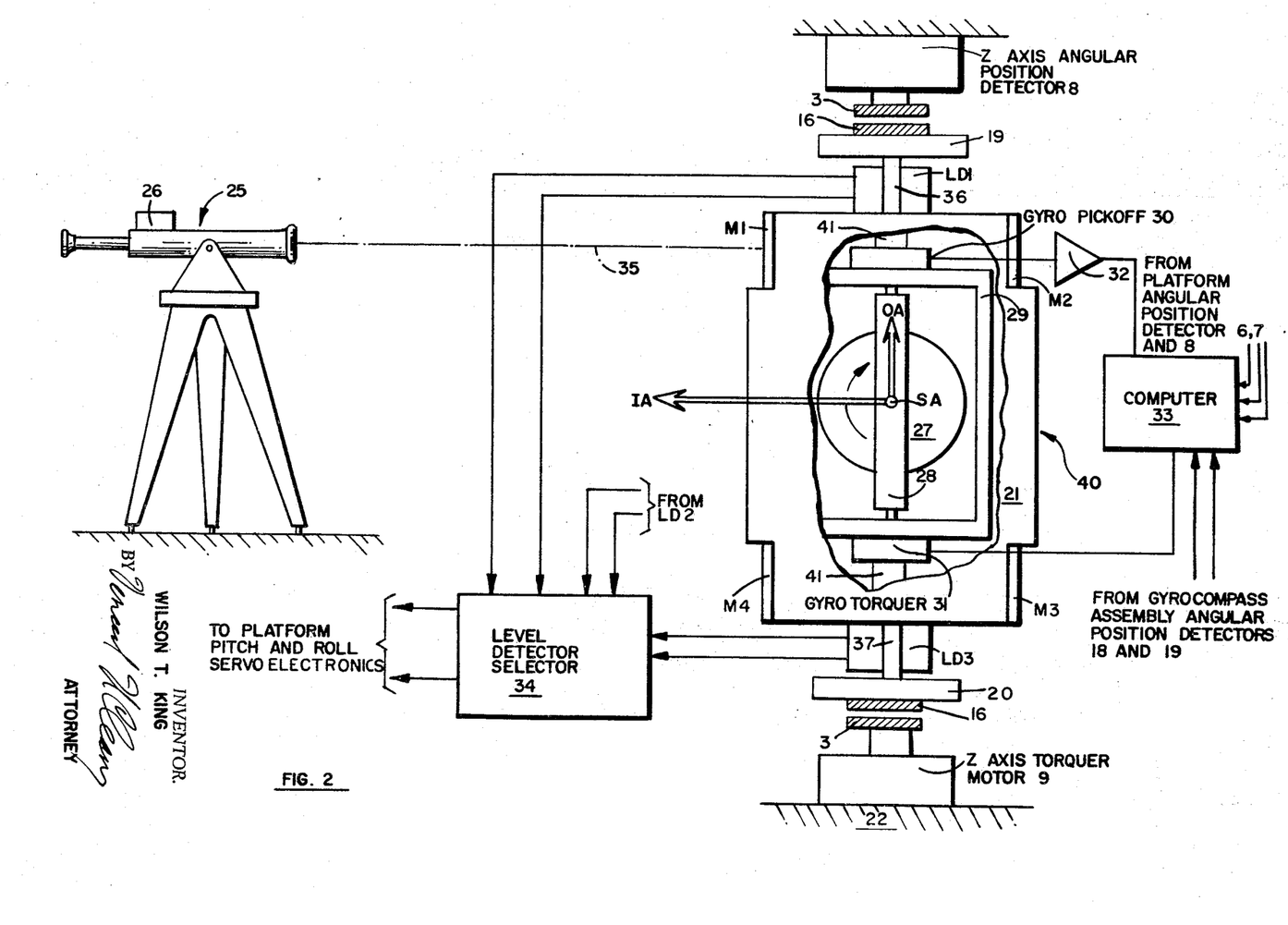
FIG. 2 is a specific view of the embodiment of FIG. 1.

In FIG. 2 there is shown in a partial sectional view the gyrocompass 40. The gyrocompass 40 is comprised of a rotor 27, a gimbal 28, an inner case 29 and an outer case 21, which is fixed to the inner case 29 by members 41. The rotor is designed to operate at high speeds about its spin axis designated SA. With the single axis configuration illustrated, the input axis is designated IA and is perpendicular to the spin axis SA. The output axis is mutually orthogonal to the input axis IA and the spin axis SA and is designated OA. Torque disturbances about the input axis IA are sensed upon the output axes OA, as a result of precession of gimbal 28, by the gyroscope pickoff 30, which in turn feeds a signal indicative of the magnitude and direction of said disturbing torques to the amplifier 32 which amplifies the signal and in turn feeds this amplified signal to computer 33 which senses the magnitude and direction of this disturbance signal and computes a correction signal. Computer 33 then sends the correction signal to the gyroscope torquer 31 so as to zero the signal present at the pickoff 30. Mirrors M1 and M2 are shown mounted on opposite sides of the case 21. The reflecting surfaces of these mirrors are to within realizable manufacturing tolerances parallel to each other.

In order to perform a self-aligning operation on an inertial guidance platform, it is necessary that the accelerometer axes be accurately defined with respect to the level detector axes, which in turn are accurately defined with respect to the mirrors. Thus, once the azimuth position of the mirrors, or the level detectors is known, the resolver 19 will relate the accelerometer coordinates to the mirror-level detector coordinates. In this embodiment the mirror-level detector coordinates form the primary guidance frame for the initial azimuth and level alignment of the stable element.

Outputs from the level detectors are sent to the level detector selector 34 which selects the level detector which is presently used to level the gyrocompass and in proper order to the platform pitch and roll servo control electronics to maintain the platform locally level when the gyrocompass case is in different positions.

There are two basic mechanisms by which an inertial instrument can distinguish true north or an east-west line. Both of these mechanisms involve a gyroscope sensing the earth's rotation. Acted upon by this input torque, the gyroscope can be mechanized to show an operator the direction of the earth's rotational axis and thus, true north. These two basic mechanisms are characterized loosely by a pendulous gyroscope and a caged gyroscope. For an example of a caged gyrocompass, that is, a gyrocompass wherein the output of the gyrocompass is fed back to the input, to maintain the output at a minimum value, see U.S. Pat. No. 2,972,195, entitled Gyro Compass by M. E. Campbell et al. In the embodiment illustrated the true east-west direction is sensed by the use of a caged gyroscope, gyrocompass 40.

Figure 4:
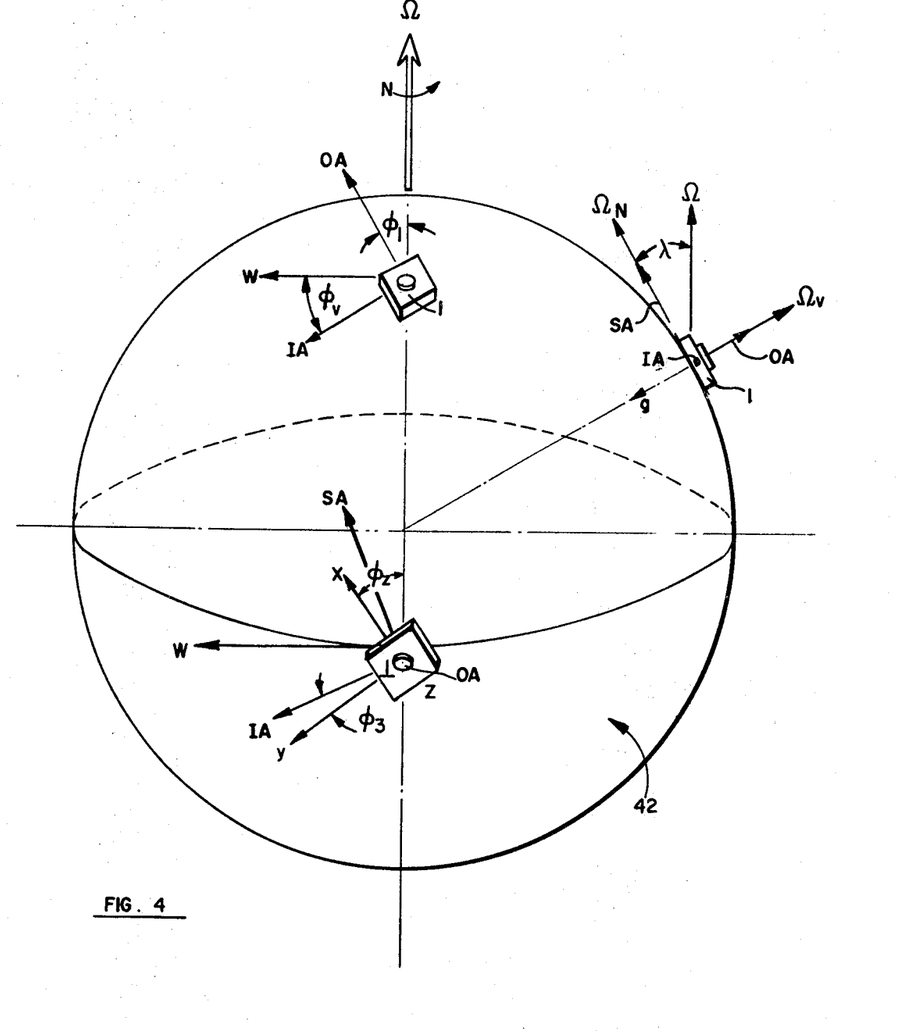
FIG. 4 illustrates various related vectors as positioned with respect to the earth.

Referring now to FIG. 4, gyrocompass 40 mounted on the platform 1 is shown in three positions on the earth 42. In the right-hand location the gyrocompass is alined such that its spin axis SA is nominally north, its input axis IA is west, and the output axis OA is along the locally vertical line defined by the vector $g$, a torque will be imposed upon the gyrocompass IA proportional to the misalignment of the spin axis SA (angular momentum vector H of the gyroscope rotor 27) from the north component of the earth's spin axis ($\Omega_N$) and the vertical component of the earth's spin axis ($\Omega_V$).

Where:

$\Omega_N = \Omega_{\cos} \lambda$
$\Omega_V = \Omega_{\sin} \lambda$
$\lambda$ = latitude angle
$\Omega$ = earth rate And the torque acting upon the input axis IA of the gyrocompass from the two earth rate components is $$T_D = H[\Omega_N \phi_Z + \Omega_V \phi_V] + T_B$$

Where:

$T_D$ = disturbing torque
$\phi_V$ = misalignment angle of the gyrocompass input axis, IA, from the true horizontal (plane parallel to east-west line), which is also equal to the misalignment angle of the gyrocompass output axis, OA, from the local vertical
$T_B$ = bias torques If a restoring torque ($T_S$) were applied to the gyrocompass 40, via torquer 31, in order to keep the gyrocompass output axis precession rates at a null, the restoring torque would have to be equal to the disturbing torque. By measuring $T_S$ (in this case the caging torque), a measure of the misalignment angle from true north ($\phi_Z$) could be made.

$$\phi_Z = \frac{T_S - T_B}{H\Omega_N} - \frac{\Omega_V}{\Omega_N} (\phi_V)$$

Where:

$$T_S = T_D$$

If $\phi_V$, the misalignment angle of the input axis IA from a true horizontal position (output axis OA vertical misalignment about north) were controlled such that $\phi_V=0$ and bias=0 then $$\phi_Z = \frac{T_B}{H\Omega_N}$$

The gyrocompass is indexed to the platform by the angular position resolvers 18 and 19. The input axis IA of the gyrocompass is always pointed nominally east or west and the platform X axis is pointed in some desired direction; in the case of a missile the direction is down range. Thus, the computer must be aware of the relative alignment of the gyrocompass input axis and the X axis of the platform.

There are two possible locations for the level detectors; one would be on the platform 1 itself. In this configuration the platform is held level to the local gravity vector $g$. This will cause the gyrocompass to have a tilt angle with respect to the local vertical because of mounting tolerances which prohibit absolute alignment of the gyrocompass' axes with those of the platform. Thus the output axis OA of the gyrocompass will have some tilt with respect to local vertical and the input axis IA of the gyrocompass will sense some vertical component of earth rate which will not be the same for various azimuth orientations of the gyrocompass with respect to the platform.

The other location for the level detectors would be as illustrated in FIGS. 1 and 2, that is, on the gyrocompass itself. In this configuration the platform is servoed to the vertical (local level) indicated by the level detectors LD1 or LD3 mounted on the gyrocompass. Thus the vertical earth rate component acting on the input axis IA of the gyrocompass is equal for all azimuth orientations of the gyrocompass with respect to the platform. Due to the manner in which the gyrocompassing routine is mechanized this error is cancelled out and thus needs no specific compensation.

Existing within the gyrocompass 40 are bias torques which act upon the gyrocompass about the output axis OA. These extraneous disturbing torques are common to all gyroscopic devices and are attributable to imperfections in the gimbal bearings, mechanical stresses in electrical connections, residual unbalance acted upon by gravity, the action of earth's magnetic field on permeable material in the gimbals, etc. These bias torques cause an erroneous indicated precession rate about the output axis which is indistinguishable from the earth rate.

The complete equation for the torque acting upon the gyrocompass reveals the error terms associated with the inherent bias torque and misalignment angles of the gyroscope when mounted in the gimbal assembly 16 to the platform.

$$\widetilde{T} = H[\Omega_N(\phi_Z+\phi_3)+\Omega_V\phi_1+\epsilon_r]$$

Where:
$\widetilde{T}$=average restoring torque applied to the gyroscope by the computer 33
$H$=angular momentum of the gyroscope rotor 27
$\Omega_N$=north component of earth rate
$\Omega_V$=vertical component of earth rate
$\phi_Z$=misalignment angle in azimuth of the gyrocompass input axis, IA, from the true east-west line, which is also equal to the misalignment angle in azimuth of the gyrocompass spin axis, SA, from true north
$\phi_3$=misalignment angle in azimuth of the gyrocompass input axis IA to the reference axis Y of the platform 1
$\phi_1$=misalignment angle of the output axis OA of the gyrocompass to the local vertical ($\Omega_V$) about the spin axis SA of the gyrocompass as indicated by the level detectors. When the level detectors indicate the local vertical exactly, $\phi_1$ is equal to $\phi_V$
$\epsilon_r$=gyrocompass bias torque which is equal to $T_B/H$ By computing T in the east, west and inverted east, west direction, that is, with input axis IA east and input axis IA west, output axis up and down, the equations representing the torques acting upon the gyrocompass in four positions may be obtained.

Figure 3:
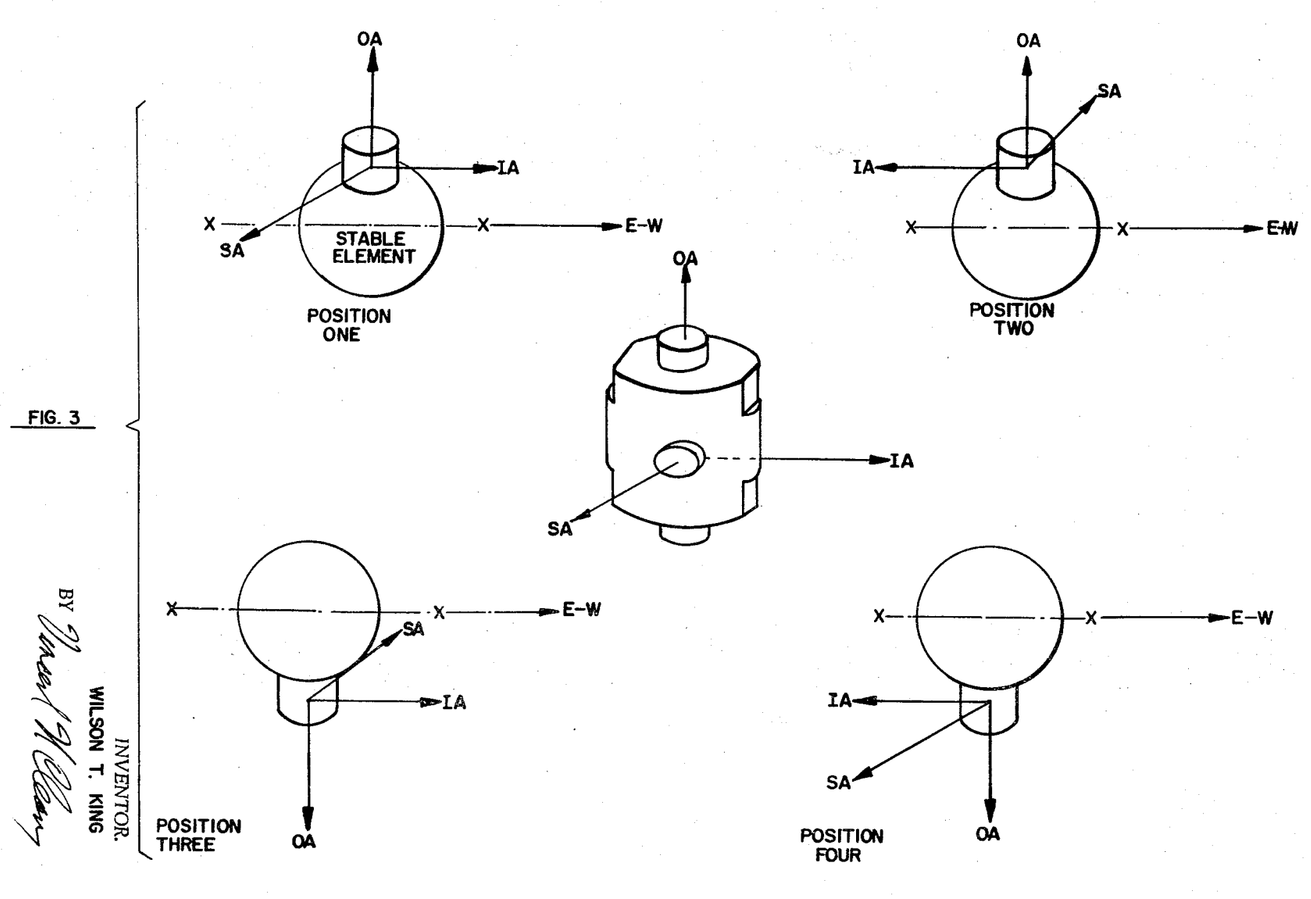
FIG. 3 illustrates vectorially the positioning of the gyrocompass.

Referring to FIG. 3, the four positions of the gyrocompass assembly are illustrated by the vectors OA, SA, and IA, superimposed on a cylinder representing the gyrocompass 40. The four positions are:

Position 1 ______________________ OA up, IA east.
Position 2 ______________________ OA up, IA west.
Position 3 ______________________ OA down, IA west.
Position 4 ______________________ OA down, IA east.

The four positions are achieved by successive rotations of the gyrocompass 40. In position 1 the gyrocompass is aligned with its OA up and substantially along the locally vertical line. The positioning of the gyrocompass output axis OA is determined by the level detector LD1. The input axis IA is aligned along an apparent east-west line in the easterly direction by energizing torquer motor 20. Resolver 19 determines when the gyrocompass input axis IA is pointed in the desired direction.

In position 3, the gyrocompass is inverted and positioned along the local vertical line by level detector LD1 and is rotated about the locally vertical line by torquer motor 20 until the IA is aligned along the apparent east-west line in a westerly direction.

In position 3, the gyrocompass is inverted and positioned by torquer motor 17 and resolver 18 with the OA maintained substantially along the locally vertical line in an opposite sense by LD3. The IA, in this position, is now aligned along the apparent east-west line in an easterly direction.

In position 4, the gyrocompass is rotated about its output axis such that the IA is aligned along the apparent east-west line in an easterly direction.

In each of the four distinct positions a torque is applied to the gyrocompass about its OA by torquer 31 so as to zero precession rates sensed by gyroscope pickoff 30. Precession rates are transmitted to the pickoff 30 by the inner gimbal 28 of the gyrocompass. With the IA aligned along the east-west line, the torques applied by gyroscope torquer 31 will be at a minimum. The computer 33 determines and stores for future computations the magnitude of the applied torque at the precession null positions.

Figure 5:
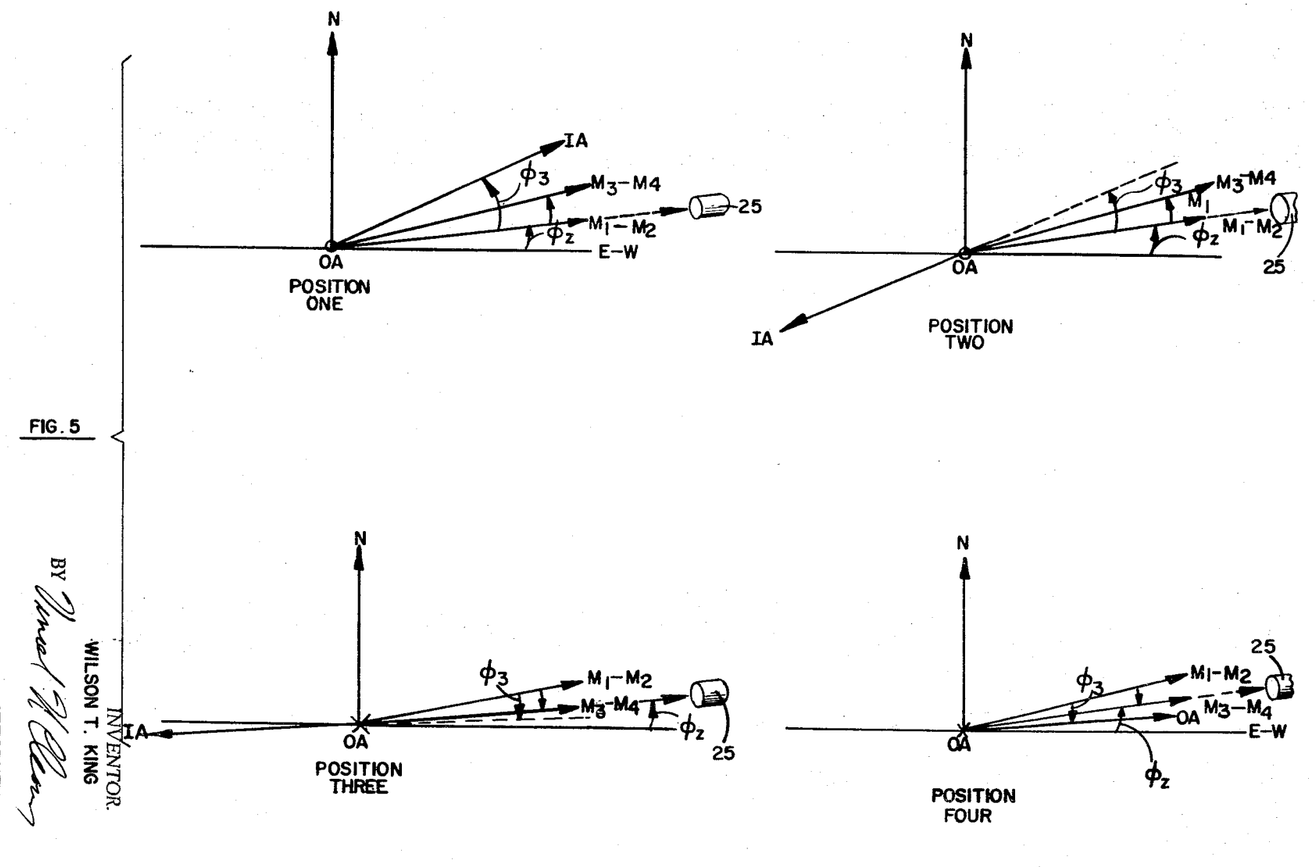
FIG. 5 illustrates various related vectors and their misalignment angles.

FIG. 5 shows, for one embodiment, the vectors involved in developing the torque balance equations. This particular utilization of the gyrocompass is dependent upon a stable optical reference 25 which will be used to sight the four mirrors in the four gyrocompassing positions and thus provide an external azimuth line which the gyrocompass will calibrate. It is not necessary that the optical line of sight be known but only that it be stable.

For the four positions as shown in FIG. 5, the torque balance equations are as follows:

$$[\widetilde{T}]_{E_V} = H\left[\Omega_N(\phi_Z+\phi_3)+\Omega_V\left(\phi_{1_{E_V}}\right)+\epsilon_{r_{E_V}}\right] \quad (1)$$

$$[\widetilde{T}]_{W_V} = H\left[-\Omega_N(\phi_Z+\phi_3)+\Omega_V\left(\phi_{1_{W_V}}\right)+\epsilon_{r_{W_V}}\right] \quad (2)$$

$$[\widetilde{T}]_{E_{-V}} = H\left[\Omega_N(\phi_Z+\zeta-\phi_3)-\Omega_V\phi_{1_{E_{-V}}}+\epsilon_{r_{E_{-V}}}\right] \quad (3)$$

$$[\widetilde{T}]_{W_{-V}} = H\left[-\Omega_N(\phi_Z+\zeta-\phi_3)-\Omega_V\phi_{1_{W_{-V}}}+\epsilon_{r_{W_{-V}}}\right]$$

$$(4)$$

Where subscripts

E signifies IA of gyrocompass is east
W signifies IA of gyrocompass is west
V signifies OA of gyrocompass is up
−V signifies OA of gyrocompass is down, and
$\zeta$=the misalignment angle between the normals of the top mirror set and the bottom mirror set The angle $\zeta$ between the top mirror set and the bottom mirror set is separately calibrated and known to a high precision.

It should be noted that a precision 180 degree turn of the gyrocompass is achieved about the OA because the gyrocompass is aligned to the external source and the opposing mirrors ($M_1$ and $M_2$) of the top mirror set are closely aligned and held stable so as to be anti-parallel. This is true also of the bottom mirror set ($M_3$ and $M_4$).

By subtracting the values obtained in the west direction from those obtained in the east direction, the two following equations are developed:

$$\frac{[\bar{T}]_{E_V}-[\bar{T}]_{W_V}}{2H\Omega_N}=\phi_Z+\phi_3+\frac{\Omega_V}{2\Omega_N}(\phi_{1_{E_V}}-\phi_{1_{W_V}})+\frac{\epsilon_{r_{E_V}}-\epsilon_{r_{W_V}}}{2\Omega_N} \quad (5)$$

$$\frac{[\bar{T}]_{E_{-V}}-[\bar{T}]_{W_{-V}}}{2H\Omega_N}=\phi_Z+\zeta-\phi_3-\frac{\Omega_V}{2\Omega_N}(\phi_{1_{E_{-V}}}-\phi_{1_{W_{-V}}})+\frac{\epsilon_{r_{E_{-V}}}-\epsilon_{r_{W_{-V}}}}{2\Omega_N} \quad (6)$$

From the physical geometry of the system, it is seen that $$\phi_{1_{E_V}}=\phi_{1_{W_V}} \text{ and } \phi_{1_{E_{-V}}}=\phi_{1_{W_{-V}}}$$

It is also assumed that $$\epsilon_{r_{E_V}}=\epsilon_{r_{W_V}}$$

$$\epsilon_{r_{E_{-V}}}=\epsilon_{r_{W_{-V}}}$$

Using these relationships, Equations 5 and 6 are reduced to:

$$\frac{[\bar{T}]_{E_V}-[\bar{T}]_{W_V}}{2H\Omega_N}=\phi_Z+\phi_3 \quad (7)$$

$$\frac{[\bar{T}]_{E_{-V}}-[\bar{T}]_{W_{-V}}}{2H\Omega_N}=\phi_Z+\zeta-\phi_3 \quad (8)$$

Now adding Equations 7 and 8 are subtracting the previously calibrated $\zeta$ angle $$\frac{[\bar{T}]_{E_V}-[\bar{T}]_{W_V}+[\bar{T}]_{E_{-V}}-[\bar{T}]_{W_{-V}}}{4H\Omega_N}-\zeta/2=\phi_Z \quad (9)$$

which is the misalignment angle of the external optical line of sight from the true east-west direction and is, therefore, the misalignment angle of the top mirror set ($M_1$ and $M_2$) from a true east-west direction.

By subtracting Equations 7 and 8 and accounting for the previously calibrated $\zeta$ angle, the expression is obtained $$\frac{[\bar{T}]_{E_V}-[\bar{T}]_{W_V}-[\bar{T}]_{E_{-V}}+[\bar{T}]_{W_{-V}}}{4H\Omega_N}+\zeta/2=\phi_3 \quad (10)$$

which is the misalignment angle between the gyrocompass' input axis and the top mirror set ($M_1$ and $M_2$) which serves as the reference for the guidance platform and to which the accelerometers are calibrated.

Continuous alignment of the platform can be maintained, therefore, by continuously rotating the gyrocompass through its first two positions only (OA up only) and applying Equation 7.

Having calibrated both an external optical line of sight and the internal misalignment angle between the top mirror set and the gyrocompass input axis, it is possible to assume the stability of one of the angle and update the other while gyrocompassing in two positions, that is, $$\frac{[\bar{T}]_{E_V}-[\bar{T}]_{W_V}}{2H\Omega_N}-\phi_3=\phi_Z \quad (11)$$

or $$\frac{[\bar{T}]_{E_V}-[\bar{T}]_{W_V}}{2H\Omega_N}-\phi_Z=\phi_3 \quad (12)$$

In the event a permanently implaced photo-electric autocollimator served as the optical line of sight and the output of this autocollimator is used to control the guidance platform in azimuth, then the long term stability of the $\phi_Z$ angle would be assumed and $\phi_3$ would be updated continuously as in Equation 12. Of course, the four-position gyrocompass mechanism, which recalibrates the angles can be used at any time it is so desired to re-establish the optical line of sight's azimuth direction.

In the event the optical device is to be removed following the completion of the four-position routine, or its long term stability is not to be trusted, then the stability of the $\phi_3$ angle between the top mirror set and the gyrocompass input axis is assumed and the system continuously performs a two-position gyrocompass routine utilizing the OA up only and applying Equation 11. The $\phi_Z$ angle between the top mirror assembly and the true east-west direction is continuously updated for purposes of maintaining the alignment of the guidance platform.

Figure 6:
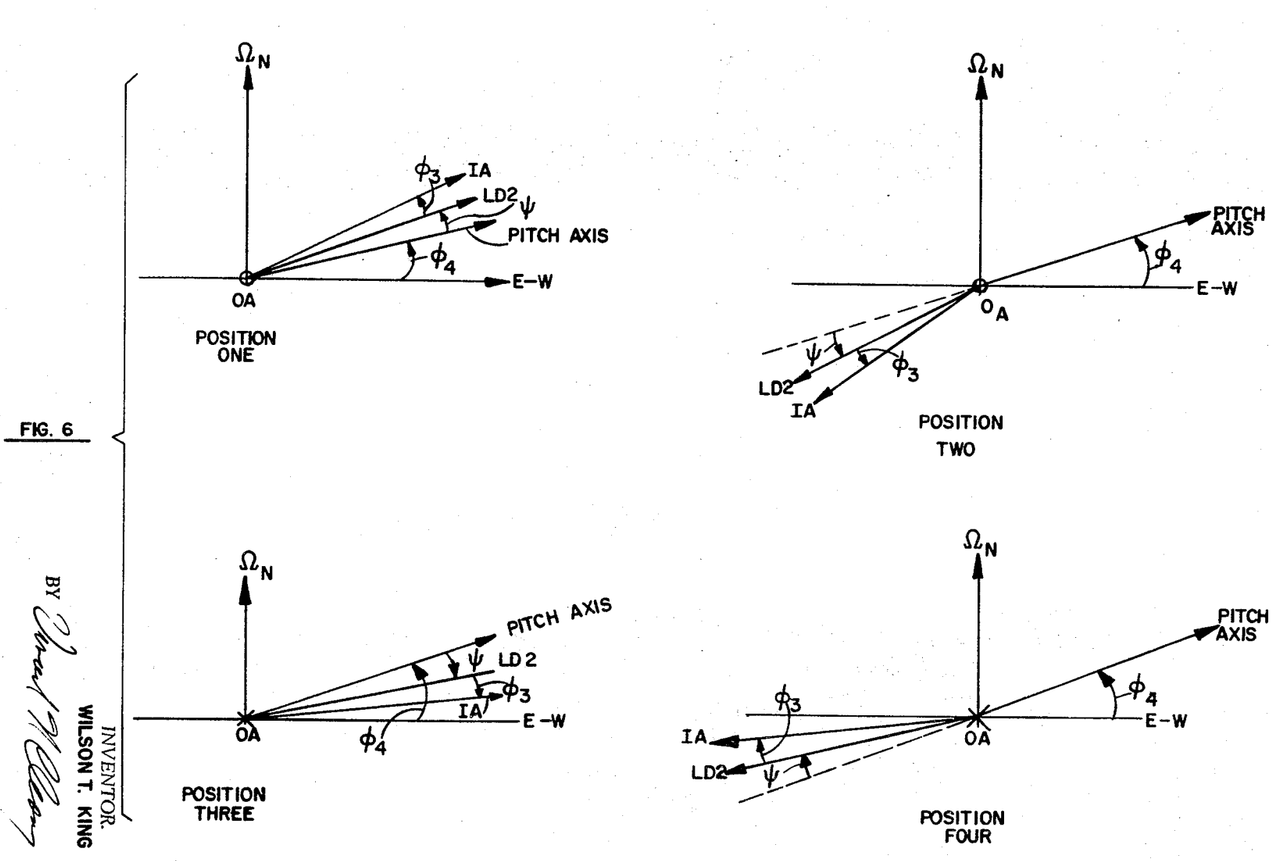
FIG. 6 illustrates additional related vectors and their misalignment angles.

In FIG. 6 a second embodiment is shown vectorially. The method shown does not utilize an external reference as an aid in determining the angles of interest.

In this method the azimuth reference used to hold the platform while the four positions are being generated is the resolver 8 on the yaw (or azimuth) gimbal. Such azimuth positioning could just as well utilize the platform azimuth gyroscope.

From FIG. 6, the torque balance equations are derived:

$$[\bar{T}]_{E_V}=H[\Omega_N(\phi_4+\phi_3+\psi)+\Omega_V\phi_{1_{E_V}}+\epsilon_{r_{E_V}}] \quad (13)$$

$$[\bar{T}]_{W_V}=H[-\Omega_N(\phi_4+\phi_3+\psi)+\Omega_V\phi_{1_{W_V}}+\epsilon_{r_{W_V}}] \quad (14)$$

$$[\bar{T}]_{E_{-V}}=H[\Omega_N(\phi_4-\phi_3-\psi)-\Omega_V\phi_{1_{E_{-V}}}+\epsilon_{r_{E_{-V}}}] \quad (15)$$

$$[\bar{T}]_{W_{-V}}=H[-\Omega_N(\phi_4-\phi_3-\psi)-\Omega_V\phi_{1_{W_{-V}}}+\epsilon_{r_{W_{-V}}}] \quad (16)$$

Where:
$\psi$=angle between level detector LD2, on the gyrocompass, and the physical pitch axis of rotation, Y, of the platform in azimuth,
$\phi_4$=angle between the rotational pitch axis, Y, of the platform and the true east-west line.

All other notations are the same as Equations 1 through 4.

Making the same assumptions as before, that is:

$$\phi_{1_{E_V}}=\phi_{1_{W_V}}$$

$$\phi_{1_{E_{-V}}}=\phi_{1_{W_{-V}}}$$

$$\epsilon_{r_{E_V}}=\epsilon_{r_{W_V}}$$

$$\epsilon_{r_{E_{-V}}}=\epsilon_{r_{W_{-V}}}$$

Equations 13, 14, 15, and 16 reduce to $$\frac{[\bar{T}]_{E_V}-[\bar{T}]_{W_V}-[\bar{T}]_{E_{-V}}+[\bar{T}]_{W_{-V}}}{4H\Omega_N}=\phi_3+\psi/2 \quad (17)$$

energy transmission sheet having a plurality of channels

The angle $\psi$ is solved by a separate calibration. In order to measure this angle, the following steps are taken:

(1) Pitch the gyrocompass around the pitch axis Y plus 90 degrees from its position in FIG. 1 so that level detector LD2 is up.

(2) Level the guidance platform to level detector LD2 and by use of the platform accelerometers measure the direction of the g vector.

(3) Then pitch the gyrocompass around the pitch axis Y to a minus 90 degree pitch orientation and rotate the gyrocompass 180 degrees about its OA roll axis X of the platform so that the level detector LD2 is again up.

(4) Level the platform to level detector LD2 and by use of the platform mounted accelerometers again measure the direction of the g vector.

(5) Using the accelerometer measured values in the two positions, compute the amount of rotation about the guidance platform Z axis that was necessary to level the level detector in the two positions.

(6) This angle is $2\Psi$.

By utilizing the calibrated $\psi$ angle, Equation 17 can be adjusted as:

$$\frac{[\hat{T}]_{E_V} - [\hat{T}]_{W_V} - [\hat{T}]_{E_{-V}} + [\hat{T}]_{W_{-V}}}{2H\Omega_N} - \psi/2 = \phi_3 \quad (18)$$

Continuous alignment of the system can be maintained as described before by continuously performing a two-position gyrocompassing routine and applying Equation 11. By knowing the azimuth angle between the guidance platform reference devices (level detector LD2 and the top mirror assembly are accurately aligned and serve as the guidance platform reference) and the gyrocompass input axis, the azimuth angle between the guidance platform reference and a true east-west line can be continuously computed, that is, from Equation 7

$$\frac{[\hat{T}]_{E_V} - [\hat{T}]_{W_V}}{2H\Omega_N} - \phi_3 = \phi_Z \quad (19)$$

After the gyrocompass is accurately aligned with a true east-west cardinal azimuth, the mirror M1 attached to the gyroscope case 21 (FIG. 2) so that the plane of its reflecting surface is parallel to the plane defined by the gyroscope output OA and spin axes SA may be used for aligning an external device such as a theodolite. If the true east-west line is known with respect to the position of the platform which is the case with missiles on their launch pads, it is possible to check the alignment of the platform in azimuth with the theodolite.

The theodolite 25 (FIG. 2) mounted on a tripod is equipped with an autocollimating eyepiece 26; the light rays 35 defining a reticle image are projected from the theodolite 25 and reflected thereto by mirror M1. By making the reticle image coincident with the primary reticle, located within the instrument, the instrument is autocollimated on the mirror M1 and the precise azimuth position of the platform may be ascertained. Depending on the orientation of the gyrocompass, the mirrors M2, M3, or M4 can be used to perform the same function as mirror M1.

In summary, an inertial navigation platform is self-aligned by utilizing a gyrocompass assembly mounted to the stabilized platform by turning the assembly through four positions while assimilating data in all four positions. The four positions of the gyrocompass assembly used for self-calibration are as follows:

OA up, IA east
OA up, IA west
OA down, IA west
OA down, IA east

Level detectors are added to the gyrocompass assembly to level the assembly in the four desired positions. The torques necessary to maintain the gyrocompass at a null displacement are measured and utilized by an averaging process to determine the misalignment errors, drift errors, and associated value of error torques inherent in the system. The human factor problem in aligning an inertial platform in azimuth is virtually eliminated by this self-aligning technique.

In addition, an optical device separate from the gyrocompass is calibrated to a high precision with respect to a true east-west line by the same techniques.

I claim:

1. A method for self aligning an inertial platform having a gyrocompass rotatably mounted thereto along with level detectors mounted on said gyrocompass providing said platform with a local horizontal reference, said gyrocompass having an input and output axis, said method comprising the steps of:
  (a) maintaining said platform locally level utilizing said level detectors;
  (b) aligning the input axis of said gyrocompass along an apparent east-west line in a first sense with the gyrocompass output axis substantially along a local vertical line;
  (c) applying to said gyrocompass to torque sufficient to zero output axis precession rates;
  (d) rotating said gyrocompass input axis 180 degrees and repeating step (c);
  (e) inverting said gyrocompass so as to substantially align said output axis in an opposite sense to said local vertical line and repeating step (c);
  (f) rotating said gyrocompass input axis 180 degrees and repeating step (c);
  (g) averaging said applied torque from steps (c) and (d) and steps (e) and (f);
  (h) determining the misalignment angles of said gyrocompass input axis with respect to said platform and with respect to a true east-west line from said average torques; and
  (i) determining from said misalignment angles the true direction of said east-west line and aligning said platform to a desired direction using said determined east-west line as a reference direction.

2. A method for self-aligning an inertial platform having a gyrocompass rotatably mounted thereto along with level detectors mounted on said gyrocompass providing said platform with locally level signals, said gyrocompass having an input and output axis, said method comprising the steps of:
  (a) maintaining said platform locally level utilizing said level detectors;
  (b) aligning said gyrocompass input axis along an apparent east-west line in four distinct positions;
  (c) determining at each position the minimum torque required to overcome output axis precession;
  (d) averaging said minimum required torques to determine a torque to be applied to said gyrocompass to accurately align said input axis to a true east-west line; and
  (e) positioning said platform about said local vertical line with respect to the accurately aligned position of said gyrocompass input axis.

3. A method for self-aligning and inertial platform having a gyrocompass rotatably mounted thereto along with level detectors mounted on said gyrocompass providing said platform with locally level signals, said gyrocompass having an input and output axis, said method comprising the steps of:
  (a) maintaining said platform locally level utilizing said level detector signals;
  (b) aligning said gyrocompass output axis substantially parallel to a local vertical line and aligning the input axis of said gyrocompass in a first sense substantially parallel to a local horizontal plane to a position requiring minimum torque to overcome output axis precession;
  (c) aligning said input axis in an opposite sense to a position requiring minimum torque to overcome output axis precession;

(d) inverting said gyrocompass to align said output axis substantially along said local vertical line in an opposite sense and said input axis in said opposite sense to a position requiring minimum torque to overcome output axis precession;

(e) aligning the input axis of said gyrocompass in said first sense to a position requiring minimum torque to overcome output axis precession;

(f) averaging said minimum torques from steps (b) and (c) and steps (d) and (e) and from said averaged torques computing a torque for aligning said input axis accurately along a reference line; and (g) positioning said platform about said local vertical line with respect to said reference line as indicated by the position of said gyrocompass input axis.

References Cited

UNITED STATES PATENTS

| | | | |
|---|---|---|---|
| 2,933,267 | 4/1960 | Slater et al. | 33—226(Z)UX |
| 3,320,819 | 5/1967 | Riordan et al. | 33—226(Z)X |
| 3,352,164 | 11/1967 | Rosen | 33—226(Z)UX |
| 3,222,795 | 12/1965 | Gevas | 33—226(Z) |
| 3,225,452 | 12/1965 | Gates | 33—226 |
| 3,237,313 | 3/1966 | Gevas | 33—226(Z) |

ROBERT B. HULL, Primary Examiner